US011935332B2

(12) United States Patent
Watanabe

(10) Patent No.: US 11,935,332 B2
(45) Date of Patent: Mar. 19, 2024

(54) SERVER AND METHOD FOR DISPLAY OF RECEPTION SCREEN

(71) Applicant: Kazufumi Watanabe, Hyogo (JP)

(72) Inventor: Kazufumi Watanabe, Hyogo (JP)

( * ) Notice: Subject to any disclaimer, the term of this patent is extended or adjusted under 35 U.S.C. 154(b) by 720 days.

(21) Appl. No.: 17/053,646

(22) PCT Filed: May 8, 2019

(86) PCT No.: PCT/JP2019/018448
§ 371 (c)(1),
(2) Date: Nov. 6, 2020

(87) PCT Pub. No.: WO2019/216356
PCT Pub. Date: Nov. 14, 2019

(65) Prior Publication Data

US 2021/0192859 A1 Jun. 24, 2021

(30) Foreign Application Priority Data

May 9, 2018 (JP) ................................ 2018-090589

(51) Int. Cl.
*G07C 9/00* (2020.01)
*G07C 1/12* (2006.01)
(Continued)

(52) U.S. Cl.
CPC ........... *G07C 1/12* (2013.01); *G07C 9/00571* (2013.01); *G07C 9/25* (2020.01); *G07C 11/00* (2013.01); *G07C 2209/08* (2013.01)

(58) Field of Classification Search
CPC ........ G07C 1/12; G07C 9/00571; G07C 9/25; G07C 11/00; G07C 2209/08; G07C 9/28; G07C 9/27; G06Q 50/10
See application file for complete search history.

(56) References Cited

U.S. PATENT DOCUMENTS 9,661,459 B2 5/2017 Finlow-Bates et al.
2013/0031611 A1 1/2013 Barreto et al.
(Continued)

FOREIGN PATENT DOCUMENTS

CN 106340103 A 1/2017
CN 107786762 A 3/2018
(Continued)

OTHER PUBLICATIONS

International Search Report for PCT/JP2019/018448 dated Jul. 2, 2019.
(Continued)

*Primary Examiner* — Jamara A Franklin
(74) *Attorney, Agent, or Firm* — Millen, White, Zelano & Branigan P.C.; William F. Nixon

(57) ABSTRACT

A server (1) executes an acquisition process (S31) of acquiring, from a terminal device (3) of a visitor (A), information to be used for identifying a visit destination of the visitor, and a reception process (S4) to (S7) of notifying a to-be-visited person at the visit destination identified by use of the information acquired, of the visit of the visitor. The reception process includes an identification process (S4) of identifying the visit destination by use of the information acquired, and a display process (S5) of causing the terminal device to display a reception screen, for the visit destination, which receives an operation performed by the visitor.

8 Claims, 9 Drawing Sheets

(51) Int. Cl.
*G07C 9/25* (2020.01)
*G07C 11/00* (2006.01)

(56) References Cited

U.S. PATENT DOCUMENTS

| | | | | |
|---|---|---|---|---|
| 2016/0241660 | A1 | 8/2016 | Nhu | |
| 2017/0034689 | A1 | 2/2017 | Lee et al. | |
| 2019/0213817 | A1* | 7/2019 | Wechsler | G07C 9/00904 |

FOREIGN PATENT DOCUMENTS

| | | | |
|---|---|---|---|
| EP | 2434720 | A1 | 3/2012 |
| JP | 2002-24879 | A | 1/2002 |
| JP | 2002-312501 | A | 10/2002 |
| JP | 2005102085 | A | 4/2005 |
| JP | 2006164060 | A | 6/2006 |
| JP | 2007-128230 | A | 5/2007 |
| JP | 2008-40625 | A | 2/2008 |
| JP | 2008-40626 | A | 2/2008 |
| JP | 2009-032188 | A | 2/2009 |
| JP | 2010-073175 | A | 4/2010 |
| JP | 2011-48817 | A | 3/2011 |
| JP | 2013-76640 | A | 4/2013 |
| JP | 2014-106913 | A | 6/2014 |
| JP | 2014-149812 | A | 8/2014 |
| JP | 2016529742 | A | 9/2016 |
| KR | 20120064437 | A | 6/2012 |

OTHER PUBLICATIONS

English Abstract of JP2009032188, Publication Date: Feb. 12, 2009.
English Abstract of JP2008040626, Publication Date: Feb. 21, 2008.
English Abstract of JP2008040625, Publication Date: Feb. 21, 2008.
English Abstract of JP2013076640, Publication Date: Apr. 25, 2013.
English Abstract of JP2002312501, Publication Date: Oct. 25, 2002.
English Abstract of JP2014106913, Publication Date: Jun. 9, 2014.
English Abstract of JP2011048817, Publication Date: Mar. 10, 2011.
English Abstract of JP2014149812, Publication Date: Aug. 21, 2014.
English Abstract of JP2002024879, Publication Date: Jan. 25, 2002.
English Abstract of JP2007128230, Publication Date: May 24, 2007.
English Abstract of JP2010073175, Publication Date: Apr. 2, 2010.
First Notification of Reasons for Refusal for Japanese Patent Application No. 2018-090589 dated Jul. 9, 2018.
English Translation of First Notification of Reasons for Refusal for Japanese Patent Application No. 2018-090589 dated Jul. 9, 2018.
Second Notification of Reasons for Refusal for Japanese Patent Application No. 2018-090589 dated Dec. 6, 2018.
English Translation of Second Notification of Reasons for Refusal for Japanese Patent Application No. 2018-090589 dated Dec. 6, 2018.
Notice of Reasons for Refusal in corresponding Japanese Patent Application No. 2019-042380 dated May 7, 2021 (pp. 1-5) and english translation thereof (pp. 1-5).

* cited by examiner

FIG.7

X COMPANY DATA

| TIME PERIOD | DATA |
|---|---|
| T1-T2 | PERSON IN CHARGE: XX1<br>RECEPTION SCHEDULE: ···<br>⋮ |
| T2-T3 | PERSON IN CHARGE: XX2<br>RECEPTION SCHEDULE: ···<br>⋮ |
| ⋮ | ⋮ |

FIG.8B

122D

X COMPANY DATA

| RANGE | DATA |
|---|---|
| P1 | PERSON IN CHARGE: XX1<br>RECEPTION SCHEDULE: ···<br>⋮ |
| P2 | PERSON IN CHARGE: XX2<br>RECEPTION SCHEDULE: ···<br>⋮ |
| ⋮ | ⋮ |

SERVER AND METHOD FOR DISPLAY OF RECEPTION SCREEN

TECHNICAL FIELD

The present disclosure relates to a server and a reception screen display method. This application claims priority on Japanese Patent Application No. 2018-090589 filed on May 9, 2018, the entire content of which is incorporated herein by reference.

BACKGROUND ART

In recent years, receptions of public facilities and commercial facilities such as companies and hotels (hereinafter referred to as "facilities, etc.") have been simplified, and various types of unmanned reception systems have been proposed. One example of an unmanned reception system uses a tablet. A visitor performs check-in through an operation such as inputting a prescribed code to a screen displayed on a tablet placed at a reception of a facility, etc.

Japanese Laid-Open Patent Publication No. 2009-32188 (hereinafter referred to as PATENT LITERATURE 1) discloses, as one example of such a reception system, a reception device that automatically performs a reception process for a visitor, in response to widespread use of mobile terminals in recent years.

CITATION LIST

Patent Literature

PATENT LITERATURE 1: Japanese Laid-Open Patent Publication No. 2009-32188

SUMMARY OF INVENTION

In a reception system as disclosed in PATENT LITERATURE 1, a device for executing a reception process has to be placed at a reception of a visit destination. The reception device disclosed in PATENT LITERATURE 1 is placed in a place or a facility that visitors visit.

According to one embodiment, a server executes an acquisition process of acquiring, from a terminal device of a visitor, information to be used for identifying a visit destination of the visitor, and a reception process of notifying a to-be-visited person at the visit destination identified by use of the information acquired, of the visit of the visitor. The reception process includes an identification process of identifying the visit destination by use of the information acquired, and a display process of causing the terminal device to display a reception screen, for the visit destination, which receives an operation performed by the visitor.

According to another embodiment, a reception screen display method includes a step of acquiring, from a terminal device of a visitor, information to be used for identifying a visit destination of the visitor, and a step of executing a reception process of notifying a to-be-visited person at the visit destination identified by use of the information acquired, of the visit of the visitor. The reception process includes a step of identifying the visit destination by use of the information acquired, and a step of causing the terminal device to display a reception screen, for the visit destination, which receives an operation performed by the visitor.

More details will be described below as embodiments.

BRIEF DESCRIPTION OF DRAWINGS

FIG. 7 shows an example of company data stored in a database used in a reception system according to a first modification.

FIG. 8B shows an example of company data for each allowable range.

DESCRIPTION OF EMBODIMENTS

Figure 1:
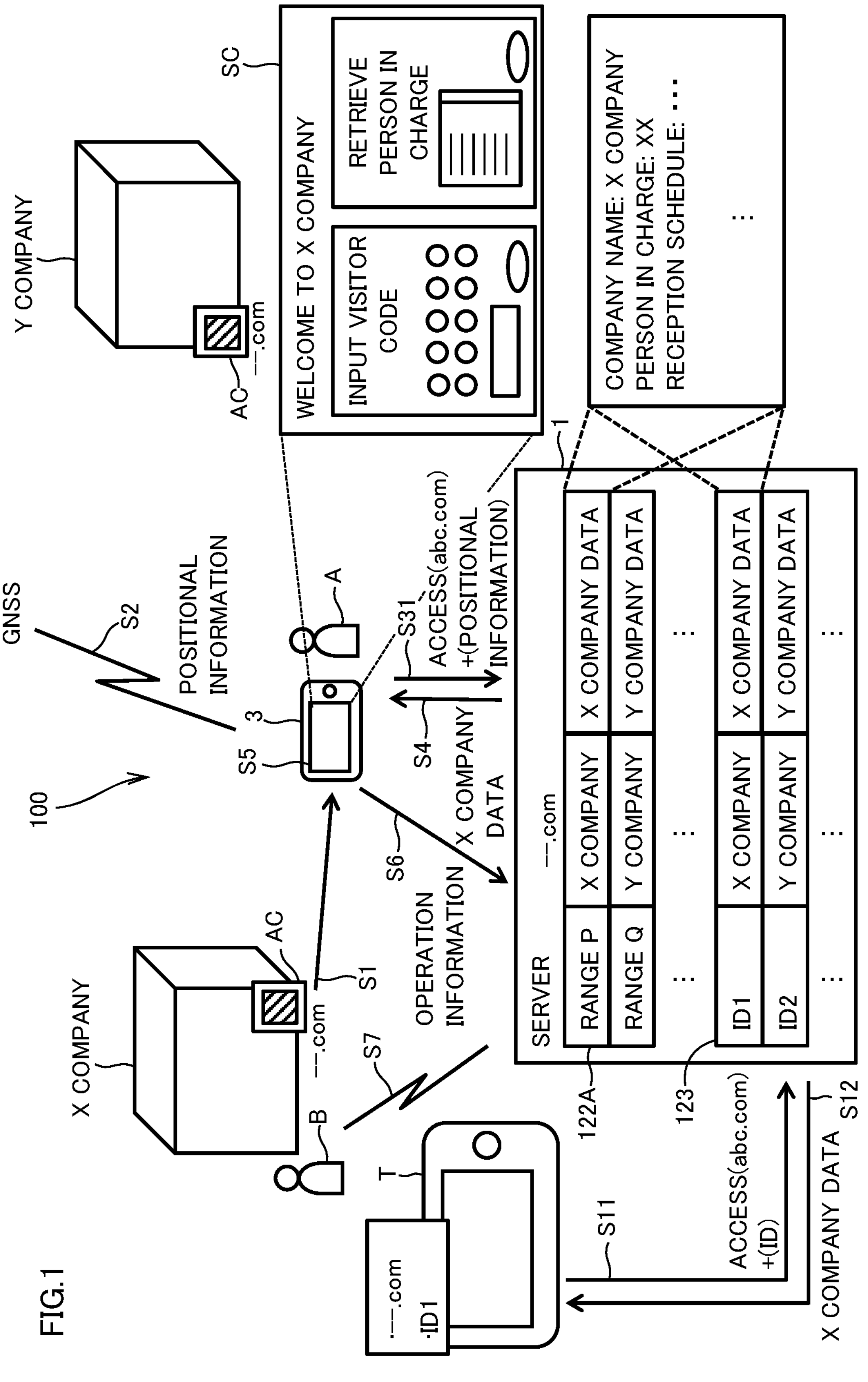
FIG. 1 shows an example of a configuration of a reception system according to a first embodiment.

1. Summaries of Server and Reception Screen Display Method (1) A server as one embodiment executes an acquisition process of acquiring, from a terminal device of a visitor, information to be used for identifying a visit destination of the visitor, and a reception process of notifying a to-be-visited person at the visit destination identified by use of the information acquired, of the visit of the visitor. The reception process includes an identification process of identifying the visit destination by use of the information acquired, and a display process of causing the terminal device to display a reception screen, for the visit destination, which receives an operation performed by the visitor. The visit destination is, for example, a location such as a public facility or a commercial facility such as a company or a hotel, a private house, or an aggregate of private houses (an apartment complex or the like).

Through the aforementioned processes performed by the server, the reception screen is displayed on the terminal device of the visitor. Therefore, the visitor can perform an operation for reception at the screen displayed on the terminal device. Thus, a device for executing a reception process, such as a tablet, need not be placed at the reception of the facility, etc.

(2) Preferably, the acquisition process includes acquiring, as information for identifying the visit destination, positional information of the terminal device when the terminal device accesses the server, and the identification process includes identifying the visit destination, based on the position of the terminal device. The positional information is: latitude/longitude information acquired from a GNSS; identification information of another device performing wireless communication, such as a beacon or a mobile phone base station, located within a communicable range; or identification information of another device capable of performing short distance communication such as NFC (Near Field Communication).

(3) Preferably, the identification process includes identifying the visit destination according to a result of determination as to whether or not the position of the terminal device belongs to each of a predetermined range set for each of the candidates of visit destinations. The predetermined range set for each of the candidates of visit destinations is, for example, a range near the visit destination, a range within a distance of about 5 minutes on foot around the location to be the candidate of the visit destination, or the like.

Thus, when the visitor is present at the position intended by the candidate of the visit destination, the terminal device can be caused to display the reception screen. That is, when the predetermined range is set to be near the visit destination, it is possible to suppose that the visitor is present at the visit destination. Therefore, it is possible to inhibit occurrence of tampering or dishonesty such that the visitor operates the reception system in spite of his/her absence at the visit destination. In addition, if the predetermined range is set to be wider than the range near the visit destination, the terminal device can be caused to display the reception screen before arriving at the visit destination, which enables early reception.

(4) Preferably, the acquisition process includes acquiring, from the terminal device having accessed the server by use of access information common to the plurality of candidates of visit destinations, the positional information of the terminal device at the time of the access.

Thus, the server can easily identify the visit destination. As a result, the server can easily determine the reception screen to be displayed on the terminal device. In addition, the visitor is released from a complicated operation of specifying the visit destination. As a result, convenience of the visitor can be improved.

(5) Preferably, the identification process includes a process in which, when the position of the terminal device belongs to all predetermined ranges set for the respective candidates of visit destinations, the visit destination is determined from among the plurality of candidates of visit destinations. Thus, each predetermined range can be set to be wide so that it partially overlaps with the predetermined ranges of other candidates of visit destinations.

(6) Preferably, the process of determining the visit destination includes displaying the plurality of candidates of visit destinations on the terminal device, and determining the visit destination, based on an operation performed to the display by the visitor. Thus, the visitor can easily specify a visit destination he/she intends to visit.

(7) Preferably, the acquisition process includes acquiring access information used by the terminal device that has accessed the server. The access information is information acquired by the terminal device at the visit destination, and includes an identifier of the visit destination. The identification process includes identifying the visit destination, based on the identifier. Thus, it is supposed that the visitor is present at the visit destination. Therefore, it is possible to inhibit occurrence of tampering or dishonesty such that the visitor operates the reception system in spite of his/her absence at the visit destination.

(8) Preferably, the display process includes a process of causing the terminal device to display different reception screens according to the distance between the visit destination and the position of the terminal device. Thus, the visitor can perform different operations according to the distance to the visit destination, resulting in improvement in convenience of the visitor.

(9) Preferably, the display process includes a process of causing the terminal device to display different reception screens according to timing at which the information to be used for identifying the visit destination of the visitor is acquired from the terminal device. Thus, different reception screens can be set according to time period. Examples of the different reception screens according to time period include: different reception screens varying between business hours and hours other than the business hours, and different reception screens varying between when a resident is at home and when the resident is out. Thus, convenience of the side to be the candidates of visit destinations can be improved.

(10) Preferably, the server executes the reception process when a time point at which the terminal device accesses the server is within a predetermined valid period. The valid period set with respect to access inhibits the terminal device from accessing the server during a time period other than the valid period. As a result, ex-post use of the access information to the server is effectively avoided.

(11) A reception screen display method as another embodiment includes a step of acquiring, from a terminal device of a visitor, information to be used for identifying a visit destination of the visitor, and a step of executing a reception process of notifying a to-be-visited person at the visit destination identified by use of the information acquired, of the visit of the visitor. The reception process includes a step of identifying the visit destination by use of the information acquired, and a step of causing the terminal device to display a reception screen, for the visit destination, which receives an operation performed by the visitor. This reception screen display method has the same effects as the server described in any of the above (1) to (10).

2. Examples of Server and Reception Screen Display Method

First Embodiment

System Configuration

FIG. 1 shows an example of a configuration of a reception system 100 according to a first embodiment. In the reception system 100, a reception process is performed upon receiving a predetermined operation from a visitor A who visits a visit destination while carrying a terminal device 3.

The visit destination of the visitor A is one or a plurality of locations selected from among one or more candidates of visit destinations. Each location is, for example, a public facility or a commercial facility such as a company or a hotel, a private house, or an aggregate of private houses (an apartment complex or the like). Company data described later indicates a location registered in the server 1 included in the reception system 100.

The reception process includes: a mediating process of mediating the visitor A to a to-be-visited person B at the visit destination; and a display process of displaying a reception screen on the terminal device 3 of the visitor A. The mediating process r includes a process of notifying the to-be-visited person B of the fact that the visitor A has visited, or the fact and the purpose of the visit. For example, the mediating process includes transmitting an e-mail (hereinafter referred to as "notification mail") that informs a terminal device (not shown) of the to-be-visited person B of the visit or the like of the visitor A.

A reception screen SC is a screen that receives an instruction of the reception process from the visitor A. As shown in FIG. 1, the reception screen SC includes, for example, a region that receives an input of a code previously assigned to the visitor A, a region that receives an instruction for searching for the to-be-visited person B, and the like.

The server 1 stores therein, for each location, data (hereinafter referred to as "company data") for displaying a reception screen for the location. The terminal device 3 previously stores therein a format for the reception screen, and the company data is data to be used for generating screen information (display data) of the reception screen when being incorporated in the format. As shown in FIG. 1, the company data includes information such as the company name, to-be-visited person, and reception schedule.

With reference to FIG. 1, the reception system 100 includes the server 1 and the terminal device 3 carried by the visitor A. The server 1 and the terminal device 3 are communicable with each other via the Internet or the like. Each of the server 1 and the terminal device 3 is also communicable with other devices. The terminal device 3 can acquire positional information indicating the position thereof from a GNSS (Global Navigation Satellite System) that is not shown.

The server 1 is used in a conventional reception system as well as in the reception system 100. The conventional reception system includes a reception tablet T placed at a reception position in each location, and the server 1 is also communicable with the reception tablet T. The reception position is where a visitor who has arrived at the location asks for mediation to a to-be-visited person, and is an entrance of a building, a reception booth, a door, a place near a mailbox, etc., for example.

Terminal Device

Figure 2:
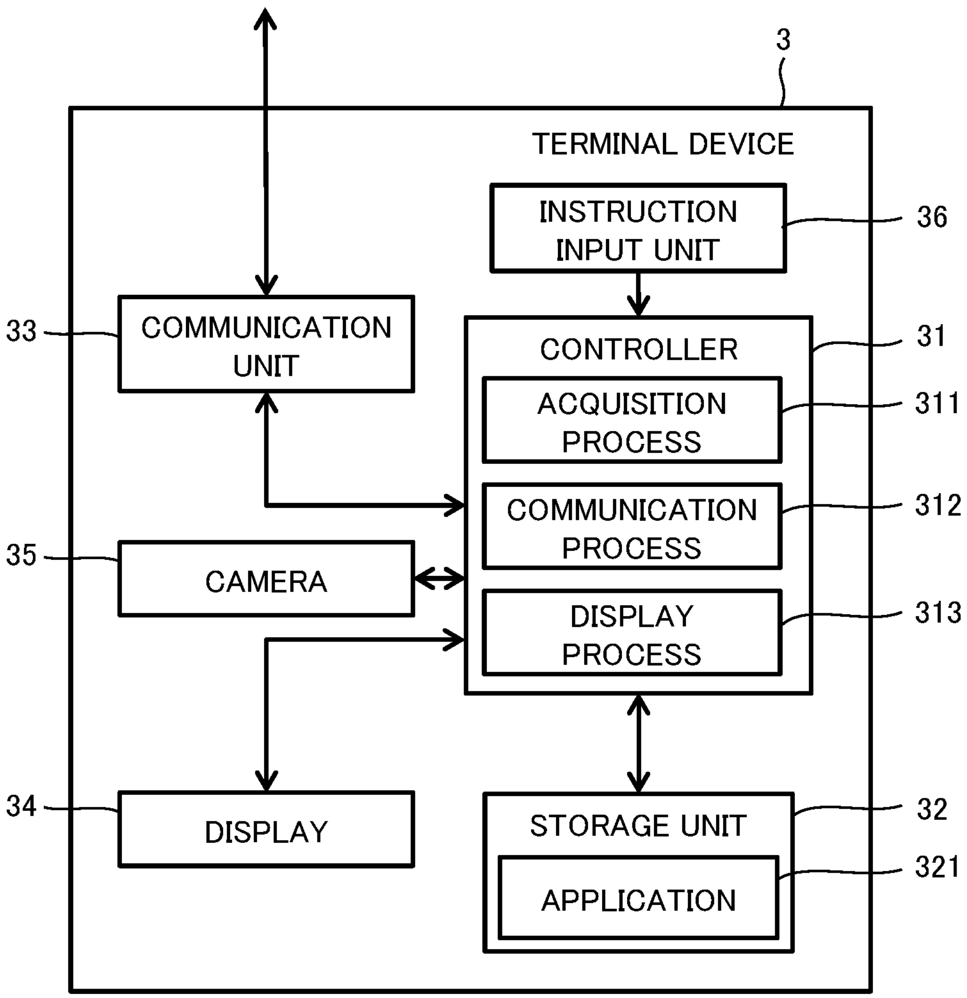
FIG. 2 is a schematic diagram showing an example of a device configuration of a terminal device included in the reception system.

FIG. 2 is a schematic diagram showing an example of a device configuration of the terminal device 3. The terminal device 3 is a smartphone, a tablet, or a laptop, for example.

A controller 31 includes a CPU (Central Processing Unit). The CPU of the controller 31 includes one or a plurality of large-scale integrated circuits (LSIs). In the CPU including a plurality of LSIs, the plurality of LSIs cooperate with each other to realize functions of the CPU.

The terminal device 3 includes an instruction input unit 36. The instruction input unit 36 is, for example, a button or the like, and receives a user operation. The instruction input unit 36 inputs an operation signal indicating the received user operation into the controller 31. The instruction input unit 36 may include a touch panel integrated with a display 34.

The CPU of the controller 31 reads out an application 321 composed of one or a plurality of programs stored in a storage unit 32, in response to the operation signal from the instruction input unit 36, and executes various types of processes. The application 321 can be transferred in a state of being recorded in a recording medium such as a CD-ROM or a DVD-ROM, or may be transferred by being downloaded from a computer device such as a server computer. The application 321 may be a so-called Web application that is operated on a Web browser, or may be a dedicated application that is operated only in the CPU of the controller 31.

The terminal device 3 includes the storage unit 32. The storage unit 32 includes: a nonvolatile memory element such as a flash memory, an EEPROM (Electrically Erasable Programmable Read Only Memory), or a ROM; and a volatile memory element such as a RAM (Random Access Memory). The nonvolatile memory element has a storage region in which the application 321 or data, etc., required for execution of the application 321 is stored. The volatile memory element has a storage region in which an update program described later, etc., are stored.

The terminal device 3 includes a communication unit 33. The communication unit 33 communicates with another device such as the server 1 under control of the controller 31 according to execution of the application 321. For example, the communication unit 33 communicates with the server 1 and transmits positional information of the terminal device 3 to the server 1. In addition, the communication unit 33 receives company data of a visit destination transmitted from the server 1, and inputs the company data into the controller 31.

The terminal device 3 includes the display 34. The controller 31 executes, according to execution of the application 321, a process of generating screen information by incorporating the company data transmitted from the server 1 into a reception screen template stored in advance, and causing the display 34 to display a reception screen.

The terminal device 3 includes a camera 35. The controller 31 inputs an instruction signal that instructs the camera 35 to perform photographing, according to execution of the application 321. The camera 35 executes a photographing operation according to the instruction signal from the controller 31, and inputs a photographed image thus obtained into the controller 31.

Server

Figure 3:
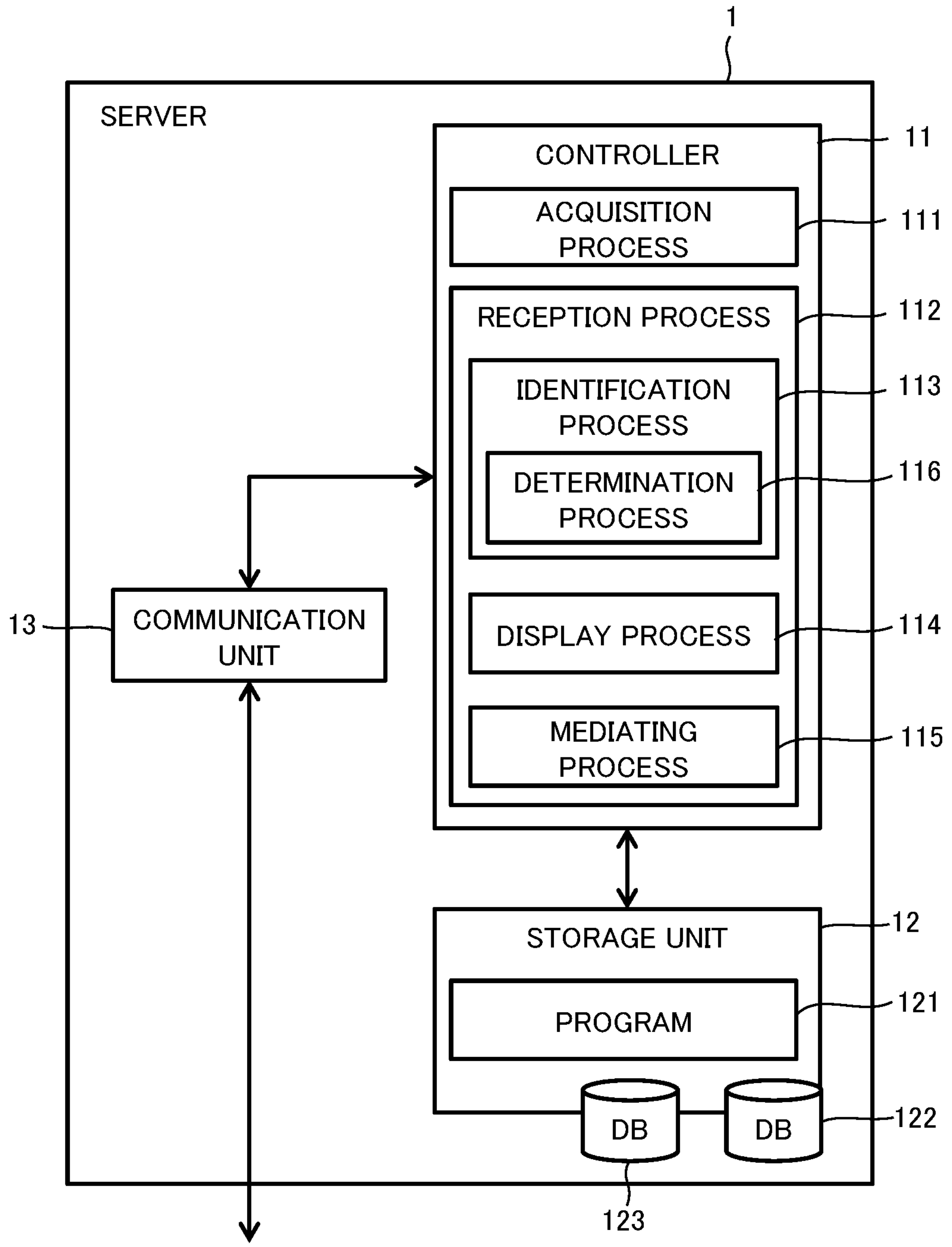
FIG. 3 is a schematic diagram showing an example of a device configuration of a server included in the reception system.

FIG. 3 is a schematic diagram showing an example of a device configuration of the server 1.

The server 1 includes a controller 11. The controller 11 includes a CPU. The CPU of the controller 11 includes one or a plurality of LSIs. In the CPU including a plurality of LSIs, the plurality of LSIs cooperate with each other to realize functions of the CPU.

The server 1 includes a communication unit 13. The CPU of the controller 11 reads out an application (computer program) 121 composed of one or a plurality of programs stored in a storage unit 12, according to, for example, information inputted through the communication unit 13, and executes various types of processes. The program 121 can be transferred in a state of being recorded in a recording medium such as a CD-ROM or a DVD-ROM, or may be transferred by being downloaded from a computer device such as a server computer.

The server 1 includes the storage unit 12. The storage unit 12 includes: a nonvolatile memory element such as a flash memory, an EEPROM, or a ROM; and a volatile memory element such as a RAM. The nonvolatile memory element has a storage region in which the program 121 or data required for execution of the program 121, etc., is stored. The volatile memory element has a storage region in which an update program described later, etc., are stored. The data required for execution of the program 121 is a database 122 and a database 123, for example.

The communication unit 13 communicates with another device such as the terminal device 3 via a communication line 2 under control of the controller 11 according to execution of the program 121. For example, the communication unit 13 accepts an access from the terminal device 3, and receives positional information from the terminal device 3. In addition, the communication unit 33 transmits the company data to the terminal device 3.

Reception Process

FIG. 1 further shows a flow of a reception process executed in the reception system 100. FIG. 1 shows a case where the visitor A carrying the terminal device 3 visits an X company which is one of a plurality of locations (X, Y companies). That is, in the following description, the companies are visit destinations for the visitor A.

At the reception position in each location, an image AC indicating an access destination to the server 1 is placed. The image AC shows access information indicating the access destination. For example, the image AC may be a plate on which a two-dimensional code of the access information is printed, or a tablet terminal on which the two-dimensional code of the access information is displayed. The access information is an URI (Uniform Resource Identifier), for example. As shown in FIG. 1, in each location, the image AC on which the two-dimensional code of the same access information is printed is placed. Therefore, no matter at which location the terminal device 3 reads the access information from the image AC and makes an access, the terminal device 3 accesses the same destination. In other words, the access destination indicated by the access information displayed on the image AC is an access destination set in common to a plurality of locations.

With reference to FIG. 1, the terminal device 3 operates the application 321, and causes the camera 35 to photograph the image AC placed at the reception position in the X company. Then, the terminal device 3 analyzes the photographed image to acquire the access information of the server 1 from the image AC (step S1).

Meanwhile, the terminal device 3 acquires the present position thereof from the GNSS according to execution of the application 321 (step S2). The positional information of the terminal device 3 is an example of information used by the server 1 to identity the visit destination of the visitor A carrying the terminal device 3. The positional information of the terminal device 3 is not limited to the information acquired from the GNSS as described above. The positional information may be identification information of another device that performs wireless communication, such as a beacon or a mobile phone base station within a communicable range, identification information of another device capable of performing short distance communication such as NFC (Near Field Communication), or the like.

The terminal device 3, having the access information acquired, accesses the server 1 by using the acquired access information, and transmits the positional information thereof acquired in step S3 to the server 1 (step S31).

The database 122A of the server 1 is a database used in the reception system 100 according to the first embodiment. The database 122A stores therein, for each location, an allowable range such as a predetermined range around the location, and company data of the location. The allowable range indicates a range in which the reception process is allowed. That is, if the terminal device 3 is within the allowable range when accessing the server 1, the terminal device 3 is allowed to perform the reception process. In the example of FIG. 1, as for the X company, a range P as an allowable range, and X company data are stored. As for a Y company, a range Q as an allowable range, and Y company data are stored.

The server 1 accessed by the terminal device 3 identifies the X company as the visit destination, based on the transmitted positional information of the terminal device 3, reads out the X company data from the database 122A, and transmits the X company data to the terminal device 3 (step S4).

Upon receiving the X company data from the server 1, the terminal device 3 generates screen information by incorporating the X company data into the reception screen template stored in advance, and displays the reception screen SC on the display 34 by using the screen information, according to execution of the application 321 (step S5).

Upon receiving a user operation performed on the reception screen SC, the terminal device 3 transmits operation information indicating the user operation to the server 1 (step S6). As one example of the mediating process based on the operation information, the server 1 transmits a notification mail to a terminal device 3 (not shown) of the to-be-visited person B who belongs to the X company (step S7).

In the conventional reception system, the reception tablet T stores therein in advance the access information of the server 1, and an ID, a password, etc., assigned to the X company where the reception tablet T is placed. The reception tablet T accesses the server 1 and transmits the ID according to an operation performed by the visitor A (step S11).

The database 123 of the terminal device 3 is a database used in the conventional reception system, and stores therein, for each ID assigned to a location, company data of the location. In the example shown in FIG. 1, as for an ID 1, the X company as a visit destination, and the X company data are stored. As for an ID 2, the Y company as a visit destination, and the Y company data are stored.

The server 1 accessed by the reception tablet T identifies the X company as the visit destination, based on the transmitted ID, and transmits the X company data to the reception tablet T (step S12). Thus, the reception screen for the X company is also displayed on the reception tablet T.

Functional Configuration of Terminal Device

FIG. 2 shows processes to be executed when the controller 31 of the terminal device 3 executes the application 321. With reference to FIG. 2, the processes to be executed by the controller 31 of the terminal device 3 include an acquisition process 311, a communication process 312, and a display process 313. That is, the application 321 causes the CPU included in the controller 31 of the terminal device 3 to execute the acquisition process 311, the communication process 312, and the display process 313.

The acquisition process 311 is a process of acquiring, by the controller 31, the access information of the server 1 and the positional information of the terminal device 3. The process of acquiring the access information of the server 1 includes, as one example, a process of photographing the image AC by the camera 35 of the terminal device 3, and converting a two-dimensional code into a URL by the controller 31. In another example, the process of acquiring the access information may include a process of receiving a URI inputted through the instruction input unit 36 by the visitor A who has visually recognized the image AC that is a sheet on which the URI is printed.

The communication process 312 is a process of accessing the server 1 by using the access information acquired by the controller 31, and transmitting the positional information of the terminal device 3 to the server 1.

The display process 313 is a process of displaying the reception screen on the display 34 by using reception data received from the server 1. As one example, the display process 313 includes a process of generating display information by incorporating the company data received from the server 1 into the reception screen template stored in advance.

Functional Configuration of Server

FIG. 3 shows processes to be executed when the controller 11 of the server 1 executes the program 121. With reference to FIG. 3, the processes to be executed by the controller 11 of the server 1 include an acquisition process 111 and a reception process 112. That is, the program 121 causes the CPU included in the controller 11 of the server 1 to execute the acquisition process 111 and the reception process 112.

The acquisition process 111 is a process of acquiring, from the terminal device 3, the positional information when the terminal device 3 accesses the server 1.

The reception process 112 includes an identification process 113, a display process 114, and a mediating process 115.

The identification process 113 is a process of identifying the visit destination of the visitor A by using the positional information acquired from the terminal device 3 by the acquisition process 111. In the identification process 113, the controller 11 reads out necessary information from the database 122A. The identification process 113 includes a determination process 116 of determining the visit destination, based on the positional information. The determination process 116 is a process of determining whether or not the position of the terminal device 3 is included in the allowable range defined in the database 122A. In the identification process 113, a location associated with the allowable range including the position of the terminal device 3 is identified as a visit destination.

The display process 114 is a process of causing the terminal device 3 to display the reception screen SC of the identified visit destination. That is, the display process 114 is a process of reading out the company data of the visit destination from the database 112A, transferring the company data to the communication unit 13, and instructing transmission of the company data to the terminal device 3.

The mediating process 115 is a process of notifying the visit of the visitor A, such as transmitting a notification mail to the to-be-visited person B, based on the operation information indicating the user operation performed on the reception screen SC displayed on the terminal device 3.

Process Flow

Figure 4:
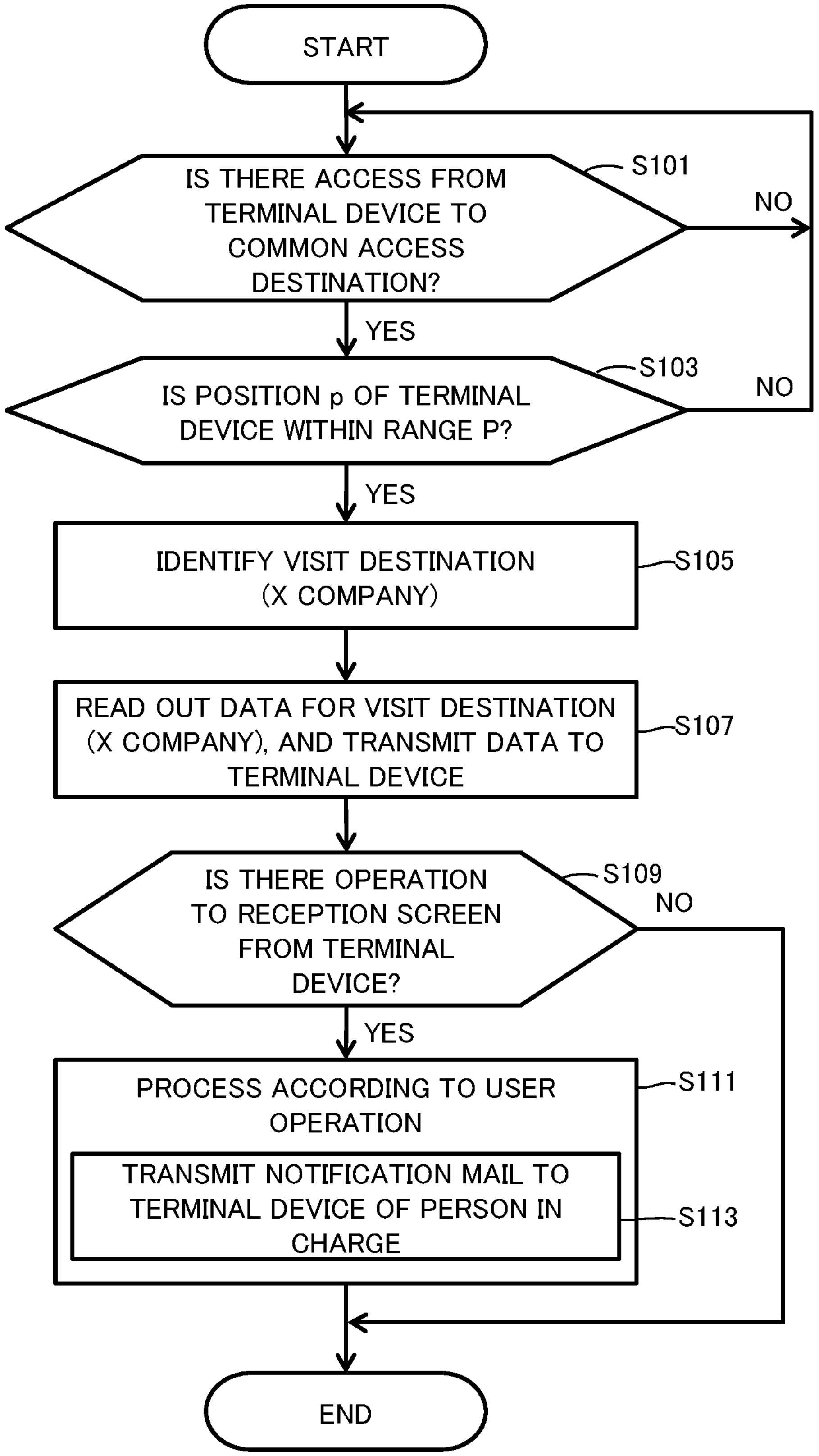
FIG. 4 is a flowchart showing a flow of a reception process executed by a controller of the server according to the first embodiment.

FIG. 4 is a flowchart showing the flow of the reception process executed by the controller 11 of the server 1 according to the first embodiment. With reference to FIG. 4, the controller 11 of the server 1 receives an access from the terminal device 3 by using the access information that is commonly set in a plurality of locations (YES in step S101), and then proceeds to the subsequent process. With reference to the reception screen database 122A, if positional information received from the terminal device 3 is included in an allowable range P set for the X company (YES in step S103), the controller 11 identifies the X company as the visit destination of the visitor A (step S105).

The controller 11 reads out the company data of the X company identified as the visit destination from the database 122A, and transmits the company data to the terminal device 3 (step S107).

The controller 11 causes the terminal device 3 to display the reception screen in step S107 and then, if the controller 11 receives, from the terminal device 3, an operation performed to the reception screen (YES in step S109), the controller 11 executes a process according to the user operation (step S111). The process according to the user operation is identical to the process in the conventional reception system and, for example, is a process of transmitting a notification mail to the terminal device carried by the to-be-visited person B specified through the user operation (step S113).

Effect of the Embodiment

In the reception system 100, a reception screen of a visit destination is displayed on the terminal device 3 carried by the visitor A. This allows the visitor A to execute the reception process without using the reception tablet T which has been required in the conventional reception system. Therefore, the reception tablet T need not be placed. As a result, the reception system is simplified. This simplification contributes to enhancement in design and appearance of the reception.

In the reception system 100 according to the first embodiment, a common access destination of the server 1 is set for a plurality of locations, and the visit destination of the visitor A is identified by using positional information of the terminal device 3 when the terminal device 3 accesses the server 1 by using the access information. Thus, the server 1 can easily identify the visit destination. As a result, the server 1 can easily determine the reception screen to be displayed on the terminal device 3. In addition, the visitor A is released from a complicated operation of specifying the visit destination. This results in improvement in convenience of the visitor A. In addition, an arbitrary reception screen can be prepared for each location. This results in improvement in convenience on the destination side.

An allowable range for each location can be set to a range extremely close to a location to be a visit destination, such as the vicinity of the location, the vicinity of the reception position, etc. With the allowable range being set as described above, if the position of the terminal device 3 is within the allowable range, it is supposed that the visitor A carrying the terminal device 3 is present at the visit destination. Therefore, in the reception system 100 according to the present embodiment, it is possible to inhibit occurrence of tampering or dishonesty such that the visitor A carrying the terminal device 3 operates the reception system 100 in spite of his/her absence at the visit destination.

The positional information of the terminal device 3 may be positional information acquired from the GNSS by the terminal device 3, or identification information of a beacon or a mobile phone base station with which the terminal device 3 is wirelessly communicable. Thus, the position of the terminal device 3 can be easily grasped.

Also, when the visitor A carrying the terminal device 3 visits the Y company, the reception screen for the Y company is displayed on the terminal device 3 in the same manner as described above. That is, regardless of which one of the registered companies the visitor A visits, the reception screen is displayed on the terminal device 3 carried by the visitor A, and the visitor A can perform the reception process by using his/her own terminal device 3. The same applies to a second embodiment described below.

Second Embodiment>

Figure 5:
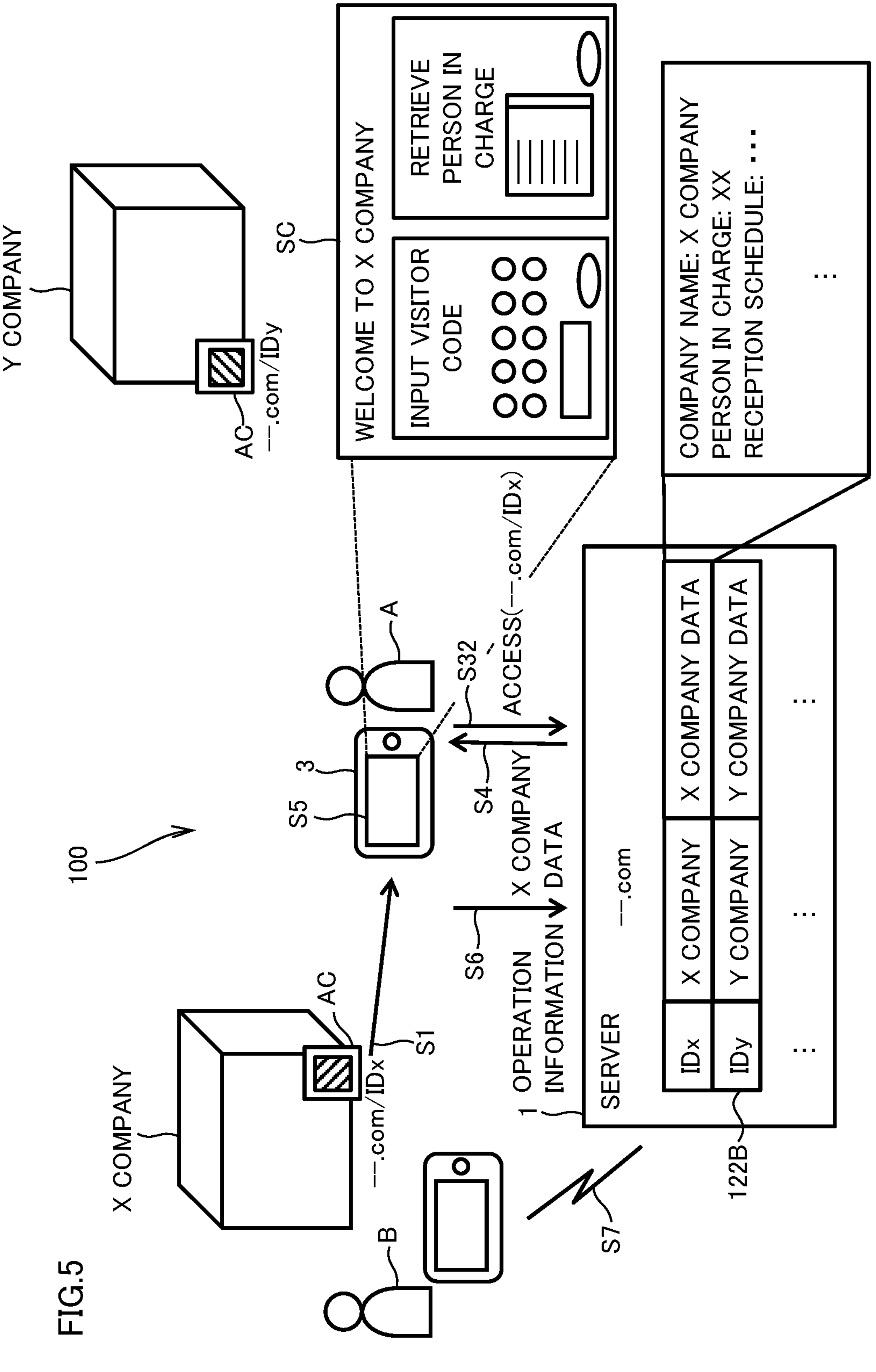
FIG. 5 shows an example of a configuration of a reception system according to a second embodiment.

FIG. 5 shows an example of the configuration of the reception system 100 according to a second embodiment. In FIG. 5, the configuration and the reception process flow of the conventional reception system are omitted for simplification. However, the server 1 of the reception system 100 according to the second embodiment is also applicable to the conventional reception system, as described with reference to FIG. 1.

With reference to FIG. 5, in the reception system 100 according to the second embodiment, at a reception position in each location, an image AC indicating an access destination to the server 1, unique to the location, is placed. The access information indicating the access destination unique to each location is, for example, information obtained by adding location identification information (IDx) to the URI of the server 1 ( . . . (URI body) . . . /IDx).

The terminal device 3 operates the application 321, and causes the camera 35 to photograph the image AC placed at the reception position in the visit destination. Then, the terminal device 3 analyzes the photographed image to acquire, from the image AC, access information of the server 1 to which the location identification information is added (step S1). Then, the terminal device 3 accesses the server 1 by using the acquired access information (step S32). The access information of the server 1, unique to each location, is one example of information that is used by the server 1 to identify the visit destination of the visitor A carrying the terminal device 3.

The server 1 according to the second embodiment has a database 122B used in the reception system 100 according to the second embodiment. In the database 122B, for each location identification information, a location of a visit destination of the visitor A carrying the terminal device 3, and company data of the location are stored. In the example shown in FIG. 5, as for identification information IDx, the X company as the visit destination, and the X company data are stored. As for identification information IDy, the Y company as the visit destination, and the Y company data are stored.

Preferably, the access information of the server 1, unique to each location, is updated at a predetermined timing. Therefore, at the predetermined timing, the image AC placed in each location is changed, and the location identification information stored in the database 122B is also changed. The predetermined timing is, for example, a constant time interval or the like. Thus, it is possible to effectively prevent an illegal reception operation, such as reusing, at a different timing, the access destination once acquired by the terminal device 3, or transferring the access destination to be used in another terminal device.

The acquisition process 111 in the server 1 according to the second embodiment is a process of acquiring, from the terminal device 3 having accessed the server 1, the access information used by the terminal device 3 for the access to the server 1. That is, the server 1 accessed by the terminal device 3 identifies the X company as the visit destination, based on the identification information IDx included in the access destination, and transmits the X company data to the terminal device 3 (step S4). The subsequent process is identical to the reception process in the reception system 100 according to the first embodiment shown in FIG. 1.

Figure 6:
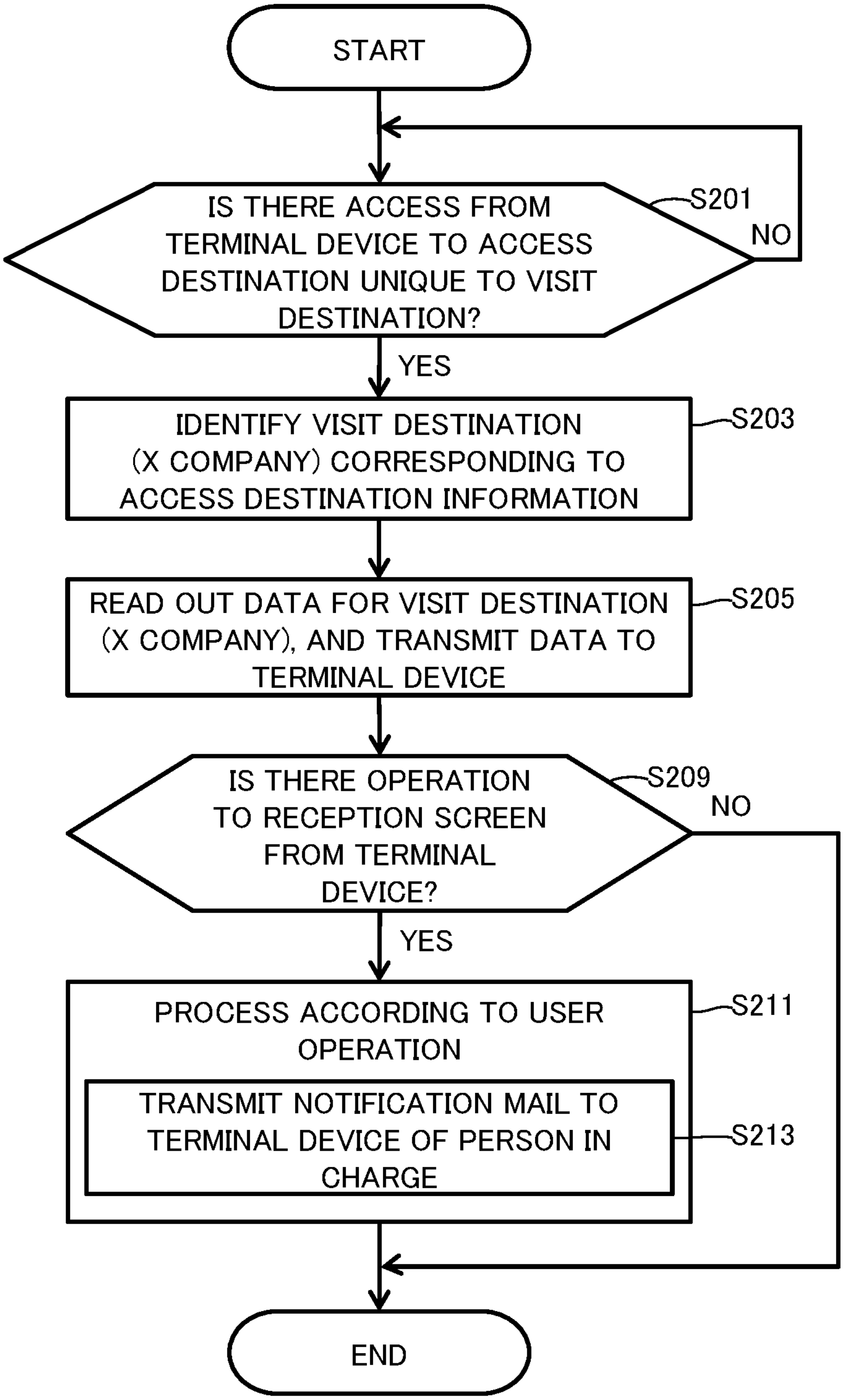
FIG. 6 is a flowchart showing a flow of a reception process executed by a controller of a server according to the second embodiment.

FIG. 6 is a flowchart showing the flow of the reception process executed by the controller 11 of the server 1 according to the second embodiment. With reference to FIG. 6, the controller 11 of the server 1 receives an access from the terminal device 3 by using the access information unique to the X company (YES in step S201), and then proceeds to the subsequent process. The controller 11 acquires the identification information IDx included in the access information, and identifies the X company associated with the identification information IDx, as the visit destination of the visitor A carrying the terminal device 3, with reference to the database 122B (step S203).

The controller 11 reads out the company data of the X company identified as the visit destination from the database 122B, and transmits the company data to the terminal device 3 (step S205).

Since the processes in steps S209 to S213 after the display of the reception screen on the terminal device 3 in step S205 are identical to the processes in steps S109 to S113 shown in FIG. 4, repeated description is not necessary.

Effect of the Embodiment

In the reception system 100 according to the second embodiment, an access destination to the server 1, which is unique to each location, is set, and a visit destination of the visitor A is identified by using the access information. Therefore, the server 1 can easily identify the visit destination. As a result, the server 1 can easily determine the reception screen to be displayed on the terminal device 3. In addition, the visitor A is released from a complicated operation of specifying the visit destination. This results in improvement in convenience of the visitor A. In addition, an arbitrary reception screen can be prepared in each location. This results in improvement in convenience on the visit destination side.

Modification 1

The reception screen to be displayed on the terminal device 3 may be varied according to time period. For example, different reception screens may be displayed between business hours and hours other than the business hours of a facility, etc. Alternatively, different reception screens may be displayed between a time period when a resident is at home and a time period when the resident is out.

FIG. 7 shows an example of company data stored in the database 122 used in the reception system 100 according to a first modification. With reference to FIG. 7, in the first modification, the company data varies for each time period. Specifically, in the example shown in FIG. 7, data related to a time period T1-T2 and data related to a time period T2-T3 are stored as the X company data.

In the controller 11 of the server 1 according to the first modification, a determination process 116 includes a process of determining company data to be transmitted to the terminal device 3, based on a time period to which the access time point of the terminal device 3 belongs.

In the server 1 according to the first modification, in step S107 in FIG. 5 or step S205 in FIG. 7, data, of the X company data stored in the database 122A or 122B, associated with the time period to which the access time point of the terminal device 3 belongs, is read out and transmitted to the terminal device 3.

In the reception system 100 according to the first modification, a reception screen can be set for each time period. Then, in the reception system 100 according to the first modification, a reception screen according to the timing at which the visitor A accesses the server 1 by using the terminal device 3 he/she is carrying, is displayed on the terminal device 3. Thus, convenience on the destination side can be improved.

For example, in each location, a reception screen for calling the to-be-visited person B as shown in FIG. 1 can be displayed on the terminal device 3 during the business hours. During the hours other than the business hours, a reception screen indicating that the reception is closed or receiving an input of a message for the to-be-visited person B, can be displayed on the terminal device 3. Meanwhile, a reception screen for calling a resident can be displayed on the terminal device 3 during the time period when the resident is at home. During the time period when the resident is out, a reception screen receiving an input of a message for the resident can be displayed on the terminal device 3.

The reception screen for each time period may be set when the destination side accesses the server 1 and performs a predetermined operation. Therefore, for example, it is possible to perform a setting such that, in a private house, a reception screen for receiving an input of a message to a resident is displayed on the terminal device 3 during a time period such as nighttime when the resident does not want to respond to a visitor, or a time period when only a resident such as a woman or a child, who does not want to respond to a visitor, is at home. Thus, the reception system 100 introduced in a private house can improve privacy and security.

Modification 2

Display of a reception screen on the terminal device 3 may not necessarily be performed only when the visitor A is present at a visit destination, and may be performed when the visitor A is some distance away from the visit destination. For example, it is supposed that, shortly before arrival of the visitor A at the visit destination, reception may be performed with a reception screen being displayed as a visit schedule on the terminal device 3.

Figure 8A:
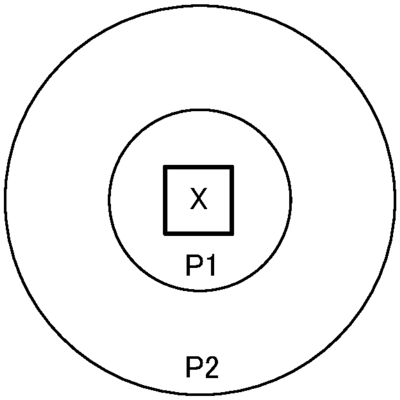
FIG. 8A illustrates an allowable range set in a reception system 100 according to a second modification.

FIG. 8A illustrates an allowable range that is set in the reception system 100 according to a second modification. FIG. 8B shows an example of company data for each allowable range. With reference to FIG. 8A, in the second modification, X company data is set for each allowable range that is set with the X company being a base. As one example, as for the X company, a first range P1 centered around the position of the X company and a second range P2 more distant from the X company than the first range P1, are set. With reference to FIG. 8B, data related to the first range P1 and data related to the second range P2 are stored as the X company data.

In the controller 11 of the server 1 according to the second modification, the determination process 116 includes a process of determining whether the position of the terminal device 3 at the access time point belongs to the first range P1 or the second range P2. And the determination process 116 includes a process of determining company data to be transmitted to the terminal device 3, based on the determination result.

In the server 1 according to the second modification, in step S107 in FIG. 5 or step S205 in FIG. 7, data, of the X company data stored in the database 122A or 122B, associated with the allowable range to which the position of the terminal device 3 at the access time point belongs, is read out and transmitted to the terminal device 3.

When the allowable range is increased, at least a part of the set allowable range may overlap with the allowable range of another location. Therefore, in the server 1 according to the second modification, in step S105 in FIG. 5 or step S203 in FIG. 7, if the allowable range, to which the position of the terminal device 3 at the access time point belongs, overlaps with a plurality of locations, the plurality of locations are regarded as candidates of visit destinations of the visitor A, and the server 1 receives a user's selection of a visit destination from among the candidates. Upon receiving, from the user, selection of one location (X company) as the visit destination, the server 1 identifies the X company as the visit destination.

In the reception system 100 according to the second modification, an arbitrary range can be set as an allowable range with the position of a location as a base. Thus, not only when the visitor A is present at the visit destination but also when the visitor A is some distance away from the visit destination, reception to the visit destination can be executed. For example, when the allowable range is set to a range within a distance of about 5 minutes on foot from the visit destination, the reception process is executed shortly before the visitor A arrives at the visit destination. As a result, the to-be-visited person B can know that the visitor A will come soon, and can easily take an action such as advance preparation.

Furthermore, in the reception system 100 according to the second modification, different reception screens can be set, for the same location, according to the allowable range. Then, in the reception system 100 according to the second modification, a reception screen according to the allowable range, to which the position of the visitor A when he/she accesses the server 1 with the terminal device 3 he/she is carrying belongs, can be displayed on the terminal device 3.

Therefore, different reception screens according to the distance between the terminal device 3 and the visit destination can be displayed on the terminal device 3. For example, it is supposed that an input of scheduled arrival time is received when the distance between the terminal device 3 and the visit destination is great, that an input of items desired to be prepared at the visit destination is received when the distance is about a medium distance, and that an input of designation of the to-be-visited person B is received when the distance is short. As a result, the visitor A can perform different operations depending on the time period before arrival at the visit destination, thereby improving convenience of the visitor A side.

Modification 3

A valid period may be set with respect to the access information indicated on an image AC. In this case, the server 1 stores therein the valid period for each access information. The valid period is days or hours, for example. For example, the valid period can be set for each access information by performing an operation on a management screen that is displayed when the server 1 is accessed with specific access information.

Upon receiving an access using access information from the terminal device 3, the controller 11 of the server 1 determines whether or not the access time point is within the valid period set with respect to the access information from the terminal device 3. When the access time point is within the valid period, the controller 11 transmits, to the terminal device 3, company data of a company identified as the visit destination.

If use of the access information acquired from the image AC is allowed without limitation even after the visit to the visit destination, the access information is likely to be reused or used for tampering. In this regard, the valid period set with respect to the access information inhibits an access to the server 1 using the access information during a period other than the valid period. As a result, ex-post use of the access information is effectively avoided.

The third modification may be combined with the first embodiment or the second embodiment. The third modification is combined with the first embodiment as follows. That is, when the controller 11 of the server 1 has received an access from the terminal device 3 by using the access information in the reception process shown in FIG. 4 (YES in step S101), then if the access time point is within the valid period set with respect to the access information and the positional information of the terminal device 3 is included in the allowable range P set for the X company (YES in step S103), the controller 11 identifies the X company as the visit destination of the visitor A and transmits the company data of the X company to the terminal device 3 (step S107). Thus, reception at the X company can be doubly confirmed by the positional information and the valid period of the terminal device 3, thereby improving security.

The third modification is combined with the second embodiment as follows. That is, upon receiving an access from the terminal device 3, the controller 11 of the server 1 identifies the X company as the visit destination, based on the identification information IDx included in the access destination. Then, if the access time point is within the valid period set with respect to the access destination including the identification information IDx, the controller 11 transmits the X company data to the terminal device 3. Thus, the valid period with respect to access can be set for each visit destination, thereby making the reception system more flexible.

Modification 4

Setting a valid period with respect to access information, as described in the third modification, is applicable not only to the reception system but also to general access information. For example, with respect to access information of a Website (site for application, etc.) that is open only for a certain period of time, the certain period of time may be set as a valid period, thereby inhibiting an access using the access information during a period other than the certain period of time.

Modification 5

In the server 1, determining a process based on positional information of the terminal device 3 having accessed the server 1, as described in the first embodiment, is also applicable to a system other than the reception system 100. That is, in the server 1 for executing a specific process, a processing system executing the specific process may be constructed when the server 1 has been accessed by the terminal device 3 and has received positional information of the terminal device 3, and the positional information is included in a predetermined allowable range. The specific process includes, for example, displaying, on the terminal device 3, an operation screen for receiving an instruction input to the server 1 from the user of the terminal device 3, and executing a process according to the instruction input performed on the operation screen.

The aforementioned processing system is a system capable of executing a process for the terminal device 3 carried by a user present in a specific location. Examples of the processing system include a system for reservation (for a vehicle, a facility, etc.) to be executed immediately before use, a locally limited application system, etc. In this case, the server 1 executes the specific process when the terminal device 3 is within the allowable range. Thus, the specific process can be performed only when the user of the terminal device 3 is present near a predetermined range from a vehicle or a facility, or in a limited area.

Modification 6

In the reception system 100, the access information to the server 1 is indicated by the image AC, and the terminal device 3 reads the access information from the image AC. Therefore, if the side performing reception places an image AC at an arbitrary position, access information can be provided at the arbitrary position. In other words, the side performing reception can arbitrarily select the position of reception.

Therefore, as described in the first embodiment and the second embodiment, the visit destination of the visitor A is not limited to a specific location such as a facility, and may be arbitrarily set by the side performing reception. For example, in an outdoor event (climbing, marathon, fishing, etc.), an image AC may be placed in a meeting place (e.g., a sheet on which the image AC is printed is pasted on a wall, a tree, a rock, etc.), which enables the reception process for the visitor A at the position. Meanwhile, even when the location varies depending on the timing or duration (various events, etc.) or a device for reception cannot be placed on an outdoor facility (fixed equipment in a playground, a fishing boat, etc.), an image AC may be placed near the location or the facility according to need, which enables the reception process for the visitor A at the position.

Third Embodiment

In the embodiments described above, the reception process is executed by the server 1 only. However, at least a part or the entirety of the reception process may be executed by the controller 31 of the terminal device 3 according to the application 321. That is, the entirety of the reception process may be executed by the application 321 in the terminal device 3, or may be executed by the application 321 in the terminal device 3 and the program 121 in the server 1 being associated with each other.

Modification 7

In the embodiments described above, the access information to the server 1 is indicated by the image AC of a URI, a two-dimensional code, or the like. However, the access information may be in another form. For example, the access information may be indicated by a character string of a URI or the like, and the visitor A may input the character string in a browser on the terminal device 3, directly or through retrieval. The terminal device 3 may access the server 1 through the browser on which the access information has been inputted, and a screen for a reception system may be displayed on the terminal device 3. In this case, positional information of the terminal device 3 may be transmitted to the server 1 through the browser, and the server 1 may identify the visit destination based on the positional information.

In the third embodiment, the application 321 may store therein the access information of the server 1, and the application 321 may transmit the positional information of the terminal device 3 to the server 1. In this case, the server 1 can identify the visit destination, based on the positional information of the terminal device 3.

3. Additional Note

According to another aspect of the present disclosure, a server as follows is provided.

(1) A server configured to acquire positional information from a terminal device when the terminal device accesses the server, and execute a specific process when the position of the terminal device at the time of access is within a predetermined allowable range.

(2) A server configured to store therein a valid period with respect to access information, and execute a specific process when an access from the terminal device by use of the access information is within the valid period.

(3) The server according to the above (2) or (3), wherein the specific process includes a process of displaying, on the terminal device, an operation screen that receives an input of an instruction to the server.

The present invention is not limited to the embodiments described above, and various modifications are possible.

REFERENCE SIGNS LIST

1 server
3 terminal device
11 controller
12 storage unit
13 communication unit
31 controller
32 storage unit
33 communication unit
34 display
35 camera
36 instruction input unit
100 reception system
111 acquisition process
112 reception process
113 identification process
114 display process
115 mediating process
116 determination process
121 program
122, 122A, 122B database
311 acquisition process
312 communication process
313 display process
321 application
A visitor
B to-be-visited person
SC reception screen

The invention claimed is:

1. A server configured:

to execute an acquisition process of acquiring, from a terminal device of a visitor, information to be used for identifying a visit destination of the visitor from among a plurality of candidates of visit destinations registered in advance; and to execute a reception process after the acquisition process, the reception process comprising:

an identification process of identifying the visit destination from among the plurality of candidates of visit destinations registered in advance, by use of the information acquired;

a display process of causing the terminal device to display a reception screen after the identification process, the reception screen being for the visit destination identified by use of the information acquired, the reception screen receiving, from the visitor, an operation for calling a to-be-visited person at the visit destination identified; and a mediating process of, upon receiving the operation performed to the reception screen by the visitor, notifying the to-be-visited person of the visit of the visitor, wherein the acquisition process includes acquiring, as information for identifying the visit destination, positional information of the terminal device when the terminal device accesses the server, wherein the identification process includes identifying the visit destination, based on the position of the terminal device, wherein the identification process includes identifying the visit destination from among the plurality of candidates of visit destinations registered in advance, according to a result of determination as to whether or not the position of the terminal device belongs to each of a predetermined range set for each of the plurality of candidates of visit destinations, and wherein the identification process includes a process in which, when the position of the terminal device is within both of predetermined ranges set for two or more candidates among the plurality of candidates of visit destinations registered in advance, the visit destination is determined from among the two or more candidates of visit destinations.

2. The server according to claim 1, wherein the acquisition process includes acquiring, from the terminal device having accessed the server by use of access information common to the plurality of candidates of visit destinations, the positional information of the terminal device at the time of the access.

3. The server according to claim 1, wherein the process of determining the visit destination includes displaying the two or more candidates of visit destinations on the terminal device, and determining the visit destination, based on an operation performed to the display by the visitor.

4. The server according to claim 1, wherein the acquisition process includes acquiring access information used by the terminal device that has accessed the server, the access information is information acquired by the terminal device at the visit destination, and includes an identifier of the visit destination, and the identification process includes identifying the visit destination, based on the identifier.

5. The server according to claim 1, wherein the display process includes a process of causing the terminal device to display different reception screens according to a distance between the visit destination and a position of the terminal device.

6. The server according to claim 1, wherein the display process includes a process of causing the terminal device to display different reception screens according to timing at which the information to be used for identifying the visit destination of the visitor is acquired from the terminal device.

7. The server according to claim 1, wherein the server executes the reception process when a time point at which the terminal device accesses the server is within a predetermined valid period.

8. A reception screen display method comprising:

a step of acquiring, from a terminal device of a visitor, information to be used for identifying a visit destination of the visitor from among a plurality of candidates of visit destinations registered in advance; and a step of executing a reception process after acquisition of the information to be used for identifying the visit destination of the visitor, the step of executing the reception process including:

a step of identifying the visit destination from among the plurality of candidates of visit destinations registered in advance, by use of the information acquired;

a step of causing the terminal device to display a reception screen after the identifying step, the reception screen being for the visit destination identified by use of the information acquired, the reception screen receiving, from the visitor, an operation for calling a to-be-visited person at the visit destination identified; and a step of, upon receiving the operation performed to the reception screen by the visitor, notifying the to-be-visited person of the visit of the visitor, wherein the step of acquiring includes acquiring, as information for identifying the visit destination, positional information of the terminal device when the terminal device accesses the server, wherein the step of identifying includes identifying the visit destination, based on the position of the terminal device, wherein the step of identifying includes identifying the visit destination from among the plurality of candidates of visit destinations registered in advance, according to a result of determination as to whether or not the position of the terminal device belongs to each of a predetermined range set for each of the plurality of candidates of visit destinations, and wherein the step of identifying includes a process in which, when the position of the terminal device is within both of predetermined ranges set for two or more candidates among the plurality of candidates of visit destinations registered in advance, the visit destination is determined from among the two or more candidates of visit destinations.

* * * * *